(12) United States Patent
Klee et al.

(10) Patent No.: US 12,491,141 B2
(45) Date of Patent: Dec. 9, 2025

(54) DENTAL ROOT CANAL FILLING COMPOSITION

(71) Applicants: DENTSPLY DETREY GMBH, Constance (DE); DENTSPLY SIRONA INC., York, PA (US)

(72) Inventors: Joachim E. Klee, Radolfzell (DE); Matthias Worm, Constance (DE)

(73) Assignee: Dentsply Sirona Inc., York, PA (US)

( * ) Notice: Subject to any disclaimer, the term of this patent is extended or adjusted under 35 U.S.C. 154(b) by 811 days.

(21) Appl. No.: 17/781,059

(22) PCT Filed: Dec. 17, 2020

(86) PCT No.: PCT/EP2020/086720
§ 371 (c)(1),
(2) Date: May 31, 2022

(87) PCT Pub. No.: WO2021/122957
PCT Pub. Date: Jun. 24, 2021

(65) Prior Publication Data
US 2023/0014155 A1 Jan. 19, 2023

(30) Foreign Application Priority Data
Dec. 17, 2019 (EP) ..................... 19217246

(51) Int. Cl.
| | | |
|---|---|---|
| *A61K 6/891* | (2020.01) | |
| *A61K 6/78* | (2020.01) | |
| *A61K 6/887* | (2020.01) | |
| *A61K 6/898* | (2020.01) | |
| *C08L 1/14* | (2006.01) | |
| *C08L 1/28* | (2006.01) | |
| *C08L 79/02* | (2006.01) | |

(52) U.S. Cl.
CPC ............ *A61K 6/891* (2020.01); *A61K 6/78* (2020.01); *A61K 6/887* (2020.01); *A61K 6/898* (2020.01); *C08L 1/14* (2013.01); *C08L 1/28* (2013.01); *C08L 79/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,519,603 A | * | 7/1970 | Batzer ............... | C08G 59/5026 528/97 |
| 3,739,041 A | * | 6/1973 | Schmid et al. ......... | C08L 67/00 528/297 |
| 2012/0082954 A1 | * | 4/2012 | Blomker ............ | A61K 6/54 433/215 |
| 2016/0297745 A1 | * | 10/2016 | Yared ................ | C07C 213/04 |
| 2019/0209440 A1 | * | 7/2019 | Klee ................. | C07D 303/23 |

FOREIGN PATENT DOCUMENTS

| | | |
|---|---|---|
| AU | 2020410373 | 6/2022 |
| CA | 3164598 | 6/2021 |
| CN | 106659642 A | 5/2017 |
| CN | 114929178 A | 8/2022 |
| CN | 114929178 B | 7/2024 |
| DE | 102012003117 A1 | 8/2013 |
| EP | 4076336 | 10/2022 |
| JP | 2023506909 | 2/2023 |
| WO | 2020208148 A1 | 10/2020 |
| WO | 2021122957 | 6/2021 |

OTHER PUBLICATIONS

Chinese Office Action dated Feb. 4, 2024.
"Canadian Application Serial No. 3,164,598, Examiners Rule 86(2) Report mailed Oct. 2, 2024", 4 pgs.
"International Application Serial No. PCT EP2020 086720, International Search Report mailed Mar. 10, 2021", 4 pgs.
"International Application Serial No. PCT EP2020 086720, Written Opinion mailed Mar. 10, 2021", 11 pgs.
"International Application Serial No. PCT EP2020 086720, International Preliminary Report on Patentability mailed Jun. 30, 2022", 13 pgs.
"Canadian Application Serial No. 3,164,598, Examiners Rule 86(2) Report mailed Oct. 4, 2023", 4 pgs.
"Canadian Application Serial No. 3,164,598, Response filed Jan. 8, 2024 to Examiners Rule 86(2) Report mailed Oct. 4, 2023", 12 pgs.
"Japanese Application Serial No. 2022-537053, Notification of Reasons for Rejection mailed Oct. 15, 2024", W English Translation, 12 pgs.
"Japanese Application Serial No. 2022-537053, Response filed Nov. 6, 2024 to Notification of Reasons for Rejection mailed Oct. 15, 2024", W English Claims, 12 pgs.
"Japanese Application Serial No. 2022-537053, Notification of Reasons for Rejection mailed Jan. 14, 2025", w English Translation, 8 pgs.
"Japanese Application Serial No. 2022-537053, Response filed Apr. 10, 2025 to Notification of Reasons for Rejection mailed Jan. 14, 2025", W/ English Claims, 11 pgs.

* cited by examiner

*Primary Examiner* — Peter A Salamon
(74) *Attorney, Agent, or Firm* — SCHWEGMAN LUNDBERG & WOESSNER, P.A.

(57) ABSTRACT

The present invention is related to a dental root canal filling composition comprising at least one di- or polyepoxide; at least one primary monoamine; and at least one diamine; wherein the at least one primary monoamine comprises at least one cyclic non-aromatic hydrocarbon group and at least one primary amino group; wherein said at least one primary amino group is directly attached to said at least one cyclic non-aromatic hydrocarbon group; or wherein said at least one primary amino group is comprised by a hydrocarbon moiety, which is directly attached to said at least one cyclic non-aromatic hydrocarbon group.

20 Claims, No Drawings

DENTAL ROOT CANAL FILLING COMPOSITION

FIELD OF THE INVENTION

The present invention relates to a dental root canal filling composition, the use of such a dental root canal filling composition for a treatment or a prevention of an endodontic disease.

The present invention is further directed to a storage-stable two-pack dental root canal filling composition making use of such an inventive dental root canal filling composition.

BACKGROUND OF THE INVENTION

Polymerizable dental compositions containing polymerizable compounds are known. Conventionally, polymerizable dental compositions are provided for a broad range of applications and must, therefore, meet diverse requirements. For example, a polymerizable dental composition may be a dental adhesive composition, a bonding agent, a pit and fissure sealant, a dental desensitizing composition, a pulp capping composition, a dental composite, a dental glass ionomer cement, a dental cement, a dental root canal sealer composition, a root canal filling composition, or a dental infiltrant.

Dental compositions are desired to approach natural tooth structure with regard to strength and appearance. Accordingly, a great effort is documented by the prior art, which is directed to the development of dental compositions having improved properties with regard to physical properties, biocompatibility, aesthetics and handling properties.

Dental compositions selected from a root canal filling composition and a pulp capping composition are subject to additional requirements in that the cured product is required to have a high radiopacity and in that the composition may not require external irradiation for curing. Moreover, it is desirable that the composition adheres to the wall of the root canal in order to further improve the tight sealing of the dental root canal. Given that the shape of the root canal may change as a result to mastication and temperature changes, the cured composition must tolerate such changes without compromising a tight seal of the root canal.

Accordingly, in order to provide such additional properties, a root canal filling composition or pulp capping composition contains radiopaque particulate fillers dispersed in a curable matrix. However, the dispersion of radiopaque particulate fillers gives rise to a stability problem of the dispersions due to the high density of the filler and the low viscosity of the curable matrix.

Moreover, in order to be able to cure a root canal filling composition or pulp capping composition in the absence of light, the composition is cured by a thermal curing mechanism which may involve step growth polymerizing epoxide precursor compounds. Prior art dental filling materials for tooth root canals have relatively long setting time and may discolour.

The gold standard of dental root canal filling material, which presently offers the best overall properties, is AH Plus® from (Dentsply DeTrey, Konstanz/Germany). The good overall properties of AH Plus® especially concern physical and thermo-mechanical properties, curing properties like gelation time and handling properties like flow- and viscosity properties. The good overall properties highly depend on the used filler composition and the structure of the epoxide-amine addition polymer, which is formed during the curing process of the AH Plus® composition. The AH Plus® dental root canal filling composition consists of an amine paste and an epoxide paste. The AH Plus® epoxide paste comprises Bisphenol A diglycidylether (CAS: 25068-38-6) as a main ingredient and the AH Plus® amine paste comprises the diamine N, N'-dibenzyl-5-oxanonandiam in-1,9 (OPC-91, CAS: 113506-22-2) and the monoamine 1-aminoadamantane (CAS: 768-94-5) as main ingredients. The use of both amine-types is essentially to adjust setting and thermo-mechanical properties.

However, these commonly used primary monoamines like 1-aminoadamantane or the very similar rimantadine are more and more under observations in terms of their toxicological classification (ECHA, European Chemical Agency) and their biocompatibility.

OBJECTIVE OF THE PRESENT INVENTION

In view of the prior art, it was thus an object of the present invention to provide new alternatives for these commonly used primary amines, which shall not exhibit the aforementioned shortcomings regarding their toxicology and biocompatibility.

In particular, it was an object of the present invention to provide alternative primary monoamines which shall be able to withstand any toxicological concerns while at the same time especially the characteristic thermomechanical properties of AH Plus can be maintained. These thermomechanical properties, in particular, have crucial impact on the performance of a dental root canal filling composition.

Additionally, it was especially an object of the present invention to provide a dental root canal filling composition, which shall exhibit a glass transition temperatures $T_g$ in the range of 40 to 50° C. and gelation times at body temperature below 16 h.

SUMMARY OF THE INVENTION

These objects and also further objects which are not stated explicitly but are immediately derivable or discernible from the connections discussed herein by way of introduction are achieved by a dental root canal filling composition having all features of claim 1. Appropriate modifications to the inventive dental root canal filling composition are protected in dependent claims 2 to 13. Further, claim 14 comprises the use of such a dental root canal filling composition for a treatment or a prevention of an endodontic disease. Claim 15 comprises the use of such a dental root canal filling composition for a storage-stable two-pack dental root canal filling composition.

The present invention accordingly provides a dental root canal filling composition comprising
  (i) at least one di- or polyepoxide;
  (ii) at least one primary monoamine; and
  (iii) at least one diamine;
  characterized in that the at least one primary monoamine
    comprises at least one cyclic non-aromatic hydrocarbon group and at least one, preferably one, primary amino group;
  wherein said at least one primary amino group is directly attached to said at least one cyclic non-aromatic hydrocarbon group; or
  wherein said at least one primary amino group is comprised by a hydrocarbon moiety, which is directly attached to said at least one cyclic non-aromatic hydrocarbon group.

It is thus possible in an unforeseeable manner to provide new alternatives for these commonly used primary amines, which does not exhibit the aforementioned shortcomings regarding their toxicology and biocompatibility.

In particular, the present invention offers alternative primary monoamines which can withstand any toxicological concerns while at the same time especially the characteristic thermomechanical properties of AH Plus can be maintained.

Additionally, present invention provides a dental root canal filling composition, which exhibits a glass transition temperature $T_g$ in the range of 40 to 50° C. and a gelation time at body temperature below 16 h.

DETAILED DESCRIPTION OF THE INVENTION

The expression "substantially free" means in the context of the present invention a concentration of less than 5 weight percent, preferably less than 2.5 weight percent, and more preferably less than 1 weight percent based on the total weight of the dental root canal filling composition.

The present invention is based on the recognition that a dental root canal filling composition comprising a primary monoamine as claimed provides a dental root canal filling composition, which has comparable and/or improved overall properties compared to the AH Plus® composition.

Moreover, the present invention is based on the recognition that a dental root canal filling composition comprising such a primary monoamine as claimed provides a dental root canal filling composition having excellent properties with regard to physical and mechanical properties, biocompatibility, aesthetics and handling properties, having a high radiopacity, a high storage stability, a low shrinkage and flexibility, a relatively short setting time, and may be cured in the absence of light. Furthermore, the dental root canal filling composition according to the present invention provides adjustable working and setting times, suitable viscosity, and shows no coloration problems.

A primary monoamine according to the present invention is adapted to act as a monomer which offers excellent reactivity, so that a dental root canal filling composition having excellent curing properties is provided. Furthermore, the use of the primary monoamine according to the present invention leads to a polymer having comparable and/or improved overall properties compared to the final polymer of the AH Plus® composition.

The present invention relates to a dental root canal filling composition comprising a specific primary monoamine. A dental root canal filling composition in accordance with the invention is adapted to form epoxide-amine addition polymers. The dental root canal filling composition in accordance with the present invention is polymerizable and polymerizes to form a thermoplastic polymer.

The terms "polymerization" and "polymerizable" relate to the combining by covalent bonding of a large number of smaller molecules, such as monomers, to form larger molecules, that is, macromolecules or polymers. The monomers may be combined to form only linear macromolecules, or they may be combined to form three-dimensional macromolecules, commonly referred to as crosslinked polymers. For example, difunctional monomers form linear polymers, whereas monomers having at least three functional groups form crosslinked polymers also known as networks. In the case of a stoichiometric ratio of the reactants and their complete conversion, the amount of leachable monomers can be significantly reduced.

The term "curing" means the polymerization of functional polymerizable compounds such as monomers, oligomers or even polymers, into a polymer network, preferably a crosslinked polymer network.

The term "curable" refers to dental composition that will polymerize upon mixing.

According to ISO 6876: 2012 the working time is a period of time, measured from the start of mixing, during which it is possible to manipulate the root canal sealer. The setting time is a period of time measured from the end of mixing at (37±1) ° C. and not less than 95% relative humidity until the sealer does not show a mechanical impression using a Gilmore-type metric indenter.

The term "storage stability" as used herein means that the dental composition keeps its characteristics, in particular its working time and setting time, even after a long storage time of for example about 2 years.

In one embodiment, the at least one cyclic non-aromatic hydrocarbon group is formed by three to nine, preferably by four to eight, more preferably by five to eight, ring-forming atoms.

In a preferred embodiment thereof, at least one of the three to nine, preferably of the four to eight, more preferably of the five to eight, ring-forming atoms of the cyclic non-aromatic hydrocarbon group is substituted by a linear or branched hydrocarbon group having 1 to 8 carbon atoms, which may be substituted by a hydroxyl group, a C1-6 alkoxy group, a C6-10 aryl group, a C6-10 aryloxy group, a C7-14 arylalkyl group, or a C7-14 arylalkoxy group.

Examples of such an inventive primary monoamine comprising at least one cyclic non-aromatic hydrocarbon group and at least one primary amino group; wherein said at least one primary amino group is directly attached to said at least one cyclic non-aromatic hydrocarbon group are:

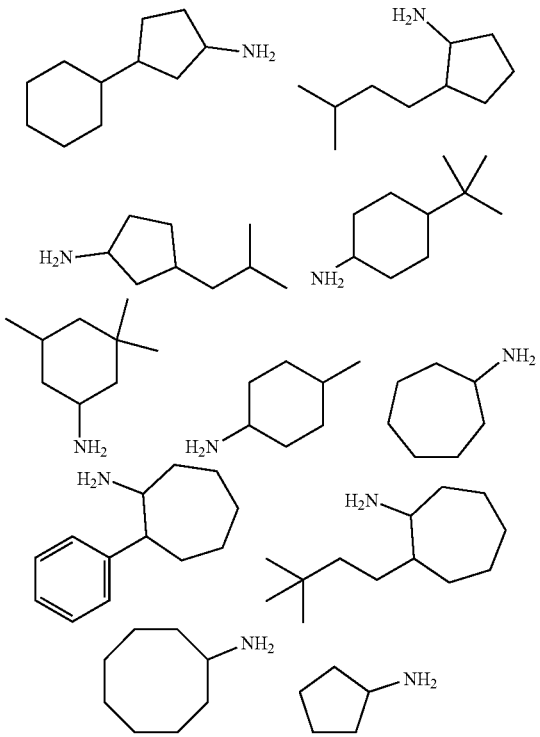

In one embodiment, the hydrocarbon moiety, which comprises the at least one primary amino group, is attached to at least one ring-forming atom of the at least one cyclic non-aromatic hydrocarbon group; wherein said at least one ring-forming atom is a carbon atom or a nitrogen atom.

Examples of such an inventive primary monoamine comprising at least one cyclic non-aromatic hydrocarbon group and at least one primary amino group; wherein said at least one primary amino group is comprised by a hydrocarbon moiety, which is directly attached to said at least one cyclic non-aromatic hydrocarbon group, are:

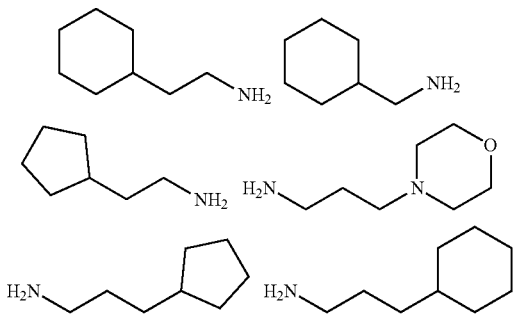

In one embodiment, at least one ring-forming atom of the at least one cyclic non-aromatic hydrocarbon group is a sulfur atom, an oxygen atom, or a nitrogen atom; with the proviso that the hydrocarbon moiety, which comprises the at least one primary amino group, is not attached to said at least one ring-forming atom.

In one embodiment, the hydrocarbon moiety, which comprises the at least one primary amino group, is a linear or branched alkyl, alkoxy, or alkenyl group; wherein preferably at least one carbon atom of the linear or branched alkyl, alkoxy, or alkenyl group is substituted by an oxygen, sulfur and/or a nitrogen atom.

The term "alkyl group" refers to a linear or branched saturated hydrocarbon chain of the respective length. This term can be exemplified by groups such as methyl, ethyl, n-propyl, iso-propyl, n-butyl, iso-butyl, sec-butyl, t-butyl, n-pentyl, isopentyl, neopentyl, n-hexyl, n-decyl, dodecyl, tetradecyl, and the like. Such alkyl groups may be substituted further with one or more substituents such as alkylene, alkoxy, nitrile, aryl, cycloalkyl, and hydroxyl.

The term "alkylene group" refers to a linear or branched hydrocarbon chain of the respective length, which comprises at least one carbon-carbon double bond. Such alkylene groups may be substituted further with one or more substituents such as alkyl, alkoxy, nitrile, aryl, cycloalkyl, and hydroxyl.

The term "alkoxy group" refers to a linear or branched hydrocarbon chain of the respective length, which comprises at least one oxygen atom in a ether structure inside of this alkoxy group (R—C—O—C—R). Such alkoxy groups may be substituted further with one or more substituents such as alkyl, alkylene, nitrile, aryl, cycloalkyl, and hydroxyl.

In one embodiment, the at least one primary monoamine further comprises at least one aromatic hydrocarbon group, wherein at least one of said aromatic hydrocarbon groups is directly attached to the at least one cyclic non-aromatic hydrocarbon group.

Examples of such an inventive primary monoamine are:

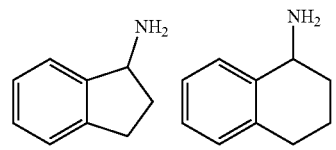

In one embodiment, the at least one diamine of the dental root canal filling composition is a disecondary diamine or a primary diamine, wherein preferably the dental root canal filling composition comprises at least one primary diamine and at least one disecondary diamine.

A primary diamine in the context of the present invention is preferably a primary aliphatic diamine according to the following formula (III):

wherein

Q' represents a substituted or unsubstituted $C_{3-20}$ alkylene group or a substituted or unsubstituted $C_{3-20}$ cycloalkylene group, wherein the substituted $C_{3-20}$ alkylene group and the substituted $C_{3-20}$ cycloalkylene group may be substituted by one or more fluorine atoms, hydroxy groups, $C_{1-6}$ alkyl groups, $C_{3-12}$ cycloalkyl groups, a $C_{1-6}$ alkoxy groups, a $C_{1-6}$ alkylthio groups, a $C_{6-10}$ aryl groups, a $C_{6-10}$ aryloxy groups, a $C_{7-14}$ arylalkyl groups, or a $C_{7-14}$ arylalkoxy groups.

In a compound of formula (III), preferably Q' represents a substituted or unsubstituted $C_{3-20}$ cycloalkylene group, more preferably Q' represents a substituted cycloalkylene group, and even more preferably Q' represents a substituted cycloalkylene group, wherein the substituents may be one or more $C_{1-6}$ alkyl groups, $C_{3-12}$ cycloalkyl groups.

In a particularly preferred embodiment, the dental composition according to the present invention comprises a primary aliphatic diamine, which is selected from the group consisting of octahydro-4,7-methano-1H-indenedimethylamine (CAS: 68889-71-4) and isophorone diamine (CAS: 2855-13-2).

A disecondary diamine in the context of the present invention is preferably a disecondary diamine according to the following formula (IV):

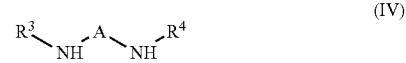

wherein

A is a divalent substituted or unsubstituted $C_{2-30}$ hydrocarbyl group, and $R^3$ and $R^4$, which may be the same or different, independently represent a $C_{1-10}$ alkyl group, a $C_{3-10}$ cycloalkyl group, or a $C_{6-11}$ arylalkyl group.

In a compound of formula (IV), A is a divalent substituted or unsubstituted $C_{2-30}$ hydrocarbyl group, which may contain up to 10 heteroatoms selected from the group consisting of N, O, S, Si. Preferably, A is a divalent unsubstituted $C_{2-30}$ hydrocarbyl group.

In one embodiment of the present invention in a compound of formula (IV), A is a divalent substituted $C_{2-30}$ hydrocarbyl group, wherein the substituents are selected from the group consisting of a hydroxyl group, a tertiary amine group, a halogen atom, a $C_{1-6}$ alkyl group, a $C_{3-10}$ cycloalkyl group, a $C_{1-6}$ alkoxy group, a $C_{5-10}$ aryl group, a $C_{6-11}$ arylalkyl group.

In a compound of formula (IV), A represent a divalent substituted or unsubstituted $C_{2-30}$ hydrocarbyl group, wherein the $C_{2-30}$ hydrocarbyl group is a $C_{2-30}$ alkylidene group, a $C_{3-10}$ cycloalkylidene group, a $C_{7-30}$ arylalkylidene group.

In a compound of formula (IV), $R^3$ and $R^4$, which may be the same or different, independently represent $C_{1-10}$ alkyl group, a $C_{3-10}$ cycloalkyl group, or a $C_{6-11}$ arylalkyl group. The $C_{1-10}$ alkyl group, the $C_{3-10}$ cycloalkyl group, or the $C_{6-11}$ arylalkyl group may be substituted or unsubstituted. Preferably, the $C_{1-10}$ alkyl group, the $C_{3-10}$ cycloalkyl group, or the $C_{6-11}$ arylalkyl group is unsubstituted. If the $C_{1-10}$ alkyl group, the $C_{3-10}$ cycloalkyl group, or the $C_{6-11}$ arylalkyl group is substituted, the substituents are selected from the group consisting of a hydroxyl group, a tertiary amine group, a halogen atom, a $C_{1-6}$ alkyl group, a $C_{3-10}$ cycloalkyl group, a $C_{1-6}$ alkoxy group, a $C_{5-10}$ aryl group, or a $C_{6-11}$ arylalkyl group.

In a preferred embodiment, the dental composition according to the present invention comprises a disecondary diamine selected from the group consisting of N,N'-dibenzylethylenediamine, N,N'-dibenzyl-3,6-dioxaoctandiamine-1,8, N,N'-dibenzyl-5-oxanonandiamine-1,9 (CAS: 113506-22-2), N,N'-dibenzyl-(2,2,4)trimethylhexamethylendiamine, N, N'-dibenzyl-(2,4,4)trimethylhexamethylendiamine, N, N'-dibenzylcyclohexylenediamine, N, N'-dibenzyl-xylylenediamine.

In one embodiment, the dental root canal filling composition further comprises at least one rheological additive and/or rheological modifier, such as ethyl cellulose and cellulose acetate butyrate.

In one preferred embodiment thereof, the dental root canal filling composition comprises an amine paste and an epoxide paste; wherein the amine paste or the epoxide paste comprises at least one rheological additive and/or rheological modifier.

In an alternative preferred embodiment thereof, the dental root canal filling composition comprises an amine paste and an epoxide paste; wherein the amine paste and the epoxide paste each comprises at least one rheological additive and/or rheological modifier.

In a preferred embodiment of both alternative preferred embodiments above, the at least one rheological additive and/or rheological modifier is a cellulose derivate, which is selected from the group consisting of cellulose ether and cellulose ester.

Herein, ethyl cellulose (CAS 9004-57-3) as cellulose ether and cellulose acetate butyrate (CAS 9004-36-8), cellulose acetate propionate (CAS 9004-39-1), cellulose acetate (CAS 9004-35-7) or cellulose propionate (CAS 9004-48-2) as cellulose ester are especially preferred.

In a most preferred embodiment, the dental root canal filling composition comprises an amine paste and an epoxide paste; wherein the amine paste and the epoxide paste each comprises at least one rheological additive and/or rheological modifier; wherein the amine paste comprises at least one rheological additive and/or rheological modifier, which is a cellulose ether, preferably ethyl cellulose; and wherein the epoxide paste comprises at least one rheological additive and/or rheological modifier, which is a cellulose ester, preferably cellulose acetate butyrate.

In the sense of the present invention, it is in general advantageous to make use of cellulose derivates in both pastes, namely the amine paste and the epoxide paste, in order to enhance the basic viscosity of the respective paste. Thereby, the risk of precipitation out of solid contents of the respective paste can be minimized or ideally completely avoided. Furthermore, under ideal circumstances an additional effect can be achieved by a networking effect in the respective paste by the cellulose derivatives.

Cellulose ethers are especially preferred in the amine paste because under certain circumstances, mainly depending on the overall composition of the respective amine paste, cellulose esters could cause in exceptional cases problems due to a possible undesired side reaction between the cellulose ester molecules and the reactive amine groups.

In one embodiment, the dental root canal filling composition further comprises at least one filler, which is not a radio-opaque particulate filler.

In one preferred embodiment thereof, the dental root canal filling composition comprises an amine paste and an epoxide paste; wherein the amine paste or the epoxide paste comprises at least one filler, which is not a radio-opaque particulate filler.

an alternative preferred embodiment thereof, the dental root canal filling composition comprises an amine paste and an epoxide paste; wherein the amine paste and the epoxide paste each comprises at least one filler, which is not a radio-opaque particulate filler.

In a preferred embodiment of both alternative preferred embodiments above, the at least one filler, which is not a radio-opaque particulate filler, is a fumed silica, which is selected from the group consisting of Aerosil® 200, Aerosile® 805 (CAS 92797-60-9), Aerosile® 202 (CAS 67762-90-7 or CAS 541-02-6), CAB-O-SIL TS 720 (CAS 67762-90-7), Aerosil® R8200 (CAS 68909-20-6), Aerosil® R812 (CAS 68909-20-6), Aerosil® R972 (CAS 68611-44-9), and Aerosil® R974 (CAS 68611-44-9).

In a most preferred embodiment, the dental root canal filling composition comprises an amine paste and an epoxide paste; wherein the amine paste and the epoxide paste each comprises at least one filler, which is not a radio-opaque particulate filler; wherein the amine paste comprises at least one filler, which is not a radio-opaque particulate filler, which is Aerosil® 200; and wherein the epoxide paste comprises at least one filler, which is not a radio-opaque particulate filler, which is a fumed silica selected from the group consisting of Aerosile® 805 (CAS 92797-60-9), Aerosile® 202 (CAS 67762-90-7 or CAS 541-02-6), CAB-O-SIL TS 720 (CAS 67762-90-7), Aerosil® R8200 (CAS 68909-20-6), Aerosil® R812 (CAS 68909-20-6), Aerosil® R972 (CAS 68611-44-9), and Aerosil® R974 (CAS 68611-44-9).

In the sense of the present invention, it is in general advantageous to make use of Aerosils in both pastes, namely the amine paste and the epoxide paste, in order to enhance the basic stability of the respective paste. Thereby, the risk of precipitation out of solid contents of the respective paste can be minim inzed or ideally completely avoided.

Hydrophobic Aerosils, such as Aerosile® 805 (CAS 92797-60-9), Aerosil® R202 (CAS 67762-90-7 or CAS 541-02-6), CAB-O-SIL TS 720 (CAS 67762-90-7), Aerosil® R8200 (CAS 68909-20-6), Aerosil® R812 (CAS 68909-20-6), Aerosil® R972 (CAS 68611-44-9), and Aerosil® R974 (CAS 68611-44-9), are especially preferred in the epoxide paste because under certain circumstances, mainly depending on the overall composition of the respective epoxide paste, said hydrophobic Aerosils offer an additional stabilizing effect of the respective epoxide paste.

In one embodiment, the dental root canal filling composition is substantially free, preferably completely free, of a compound of the following formula (I)

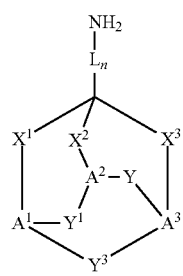

wherein

L is a direct bond; or a straight-chain or branched hydrocarbon group having 1 to 8 carbon atoms, which may be substituted by one or more fluorine atoms, a hydroxyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group;

at least one of $A^1$, $A^2$, and $A^3$, represents CH, and the remaining groups are a group C—$R^1$;

at least three of $X^1$, $X^2$, $X^3$, $Y^1$, $Y^2$, and $Y^3$, represent $CH_2$, and the remaining groups are a $CHR^2$-group, a $CR^3R^4$-group, or a C=$NR^5$-group; and n is 0 or 1; wherein $R^1$ is a fluorine atom, a hydroxyl group, an amino group, a $C_{1-6}$ alkyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group; and $R^2$ is a fluorine atom, a hydroxyl group, an amino group, a $C_{1-6}$ alkyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group;

$R^3$ and $R^4$ which may be the same or different, independent from each other represent a fluorine atom, a $C_{1-6}$ alkyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group, or $R^3$ and $R^4$ may be linked together and forming together with the carbon atom to which they are bonded a 3 to 6-membered saturated hydrocarbon ring;

$R^5$ is a hydroxyl group, an amino group, a $C_{1-6}$ alkyl group, a $C_{1-6}$ alkoxy group, a $C_{6-10}$ aryl group, a $C_{6-10}$ aryloxy group, a $C_{7-14}$ arylalkyl group, or a $C_{7-14}$ arylalkoxy group;

provided that when n is 0, then at least one of $R^1$, $R^2$, $R^3/R^4$ and $R^5$, is present.

It is especially preferred that the dental root canal filling composition is substantially free, preferably completely free, of a compound having one of the following formulas:

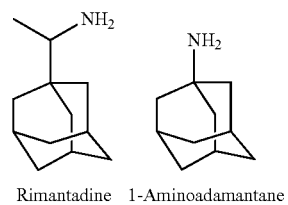

Rimantadine 1-Aminoadamantane

In one embodiment, the at least one di- or polyepoxide is a compound of the following formula (II):

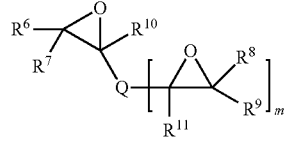

wherein

Q is a (m+1)-valent organic group, $R^6$, $R^7$ and $R^{10}$ which may be the same or different and which are independent from each other, represent a hydrogen atom, or a $C_{1-6}$ alkyl group, the $R^8$, $R^9$ and $R^{11}$ which may be the same or different and which are independent from each other, represent a hydrogen atom, or a $C_{1-6}$ alkyl group, m is an integer of from 1 to 3.

In a compound of formula (II), Q represents an (m+1)-valent organic group. Preferably, Q represents a 2-valent organic group, or a 3-valent organic group, and more preferably, Q represents a 2-valent organic group.

The (m+1)-valent organic group, may be a group having a total of 1 to 40 carbon atoms, preferably 2 to 20 carbon atoms. The organic group may include an aliphatic, alicyclic, or aromatic moiety or a combination of two or more of such moieties. The organic group may further include one or more functional groups such as amide groups, ester groups, urethane groups, urea groups, keto groups, ether groups, thioether groups, carbonate groups, or tertiary amino groups, which link two or more aliphatic, alicyclic, or aromatic moieties. Furthermore, the organic group may be substituted by one or more substituents selected from hydroxyl groups, halogen atoms, a $C_{1-6}$ alkyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group.

Preferably, the (m+1)-valent organic group may include alicyclic or aromatic moiety, and more preferably the (m+1)-valent organic group includes an aromatic moiety.

In a preferred embodiment, Q represents the following group:

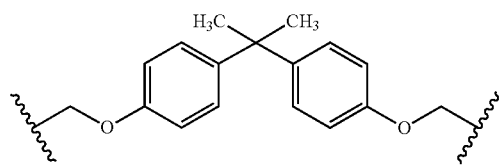

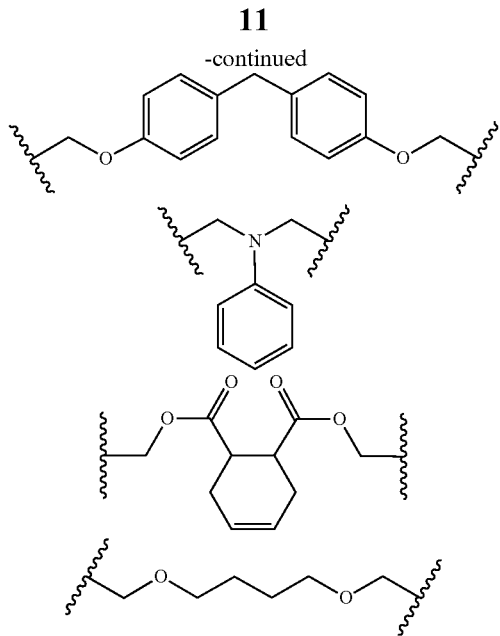

In a compound of formula (II), m is an integer of from 1 to 3. Preferably, m is an integer of from 1 to 2, and more preferably m is 1.

In a compound of formula (II), $R^6$, $R^7$ and $R^{10}$ which may be the same or different and which are independent from each other, represent a hydrogen atom, or a $C_{1-6}$ alkyl group. Preferably, $R^6$, $R^7$ and $R^{10}$ represent a hydrogen atom. In a particularly preferred embodiment, all three of $R^6$, $R^7$ and $R^{10}$ represent a hydrogen atom.

In a compound of formula (II), the $R^8$, $R^9$ and $R^{11}$ which may be the same or different and which are independent from each other, represent a hydrogen atom, or a $C_{1-6}$ alkyl group. Furthermore, in a compound of formula (II), if more than one $R^8$ is present, the more than one $R^8$ may be different. In a compound of formula (II), if more than one $R^9$ is present, the more than one $R^9$ may be different. In a compound of formula (II), if more than one $R^{11}$ is present, the more than one $R^{11}$ may be different. Preferably, $R^8$, $R^9$ and $R^{11}$ represent a hydrogen atom. In a particularly preferred embodiment, all of the $R^8$, $R^9$ and $R^{11}$ moieties which are present are hydrogen atoms.

In particularly preferred embodiment, the compound according to formula (II) is Bisphenol A Diglycidylether (CAS: 25068-38-6), or Bis-[4-(-2,3-epoxypropoxy)phenyl]-methane (CAS: 9003-36-5).

In one embodiment, the dental root canal filling composition further comprises an aliphatic polyamine selected among compounds of the following structures:

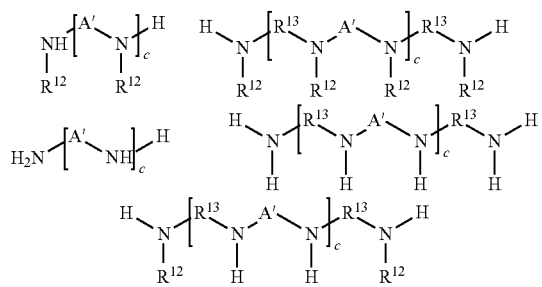

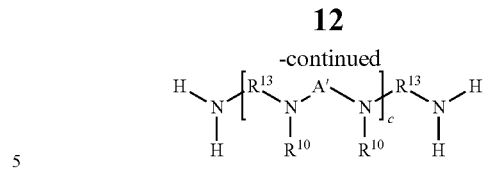

wherein $R^{12}$ is hydrogen or a substituted or unsubstituted $C_{1-18}$ alkyl group, a substituted or unsubstituted $C_{3-18}$ cycloalkyl group, or a substituted or unsubstituted $C_{7-18}$ aryalkyl group, $R^{13}$ is a difunctional substituted or unsubstituted $C_1$ to $C_{18}$ alkylene group, or a substituted or unsubstituted cycloalkylene group, A' is a moiety derived from a compound that is capable of an addition reaction with amines such as di- or polyepoxides, and c is an integer.

In an aliphatic polyamine according to the structures above, preferably $R^{12}$ is hydrogen, a substituted or unsubstituted $C_{3-18}$ cycloalkyl group, or a $C_{7-18}$ arylalkyl group. More preferably, $R^{12}$ is a substituted or unsubstituted $C_{3-18}$ cycloalkyl group, or a substituted or unsubstituted $C_{7-18}$ arylalkyl group. Even more preferably, $R^{12}$ is a substituted or unsubstituted $C_{7-18}$ arylalkyl group. In a particularly preferred embodiment, $R^{12}$ is an unsubstituted $C_{7-18}$ arylalkyl group.

In an aliphatic polyamine according to the structures above, preferably $R^{13}$ is difunctional substituted or unsubstituted $C_1$ to $C_{18}$ alkylene group, more preferably $R^{13}$ is a difunctional unsubstituted $C_1$ to $C_{18}$ alkylene group.

In an aliphatic polyamine according to the structure above, A' is a moiety derived from a compound that is capable of an addition reaction with amines such as di- or polyepoxides. Preferably, A' is a moiety derived from an addition reaction of a di- or polyepoxide according to formula (II) and an amine. More preferably, A' is a moiety derived from an addition reaction of an amine with a compound of formula (II) which is a diepoxide.

In a preferred embodiment, A' is a moiety derived from an addition reaction of an amine and a compound of formula (II) which is a diepoxide, and wherein in the compound of formula (II) Q represents the following structures:

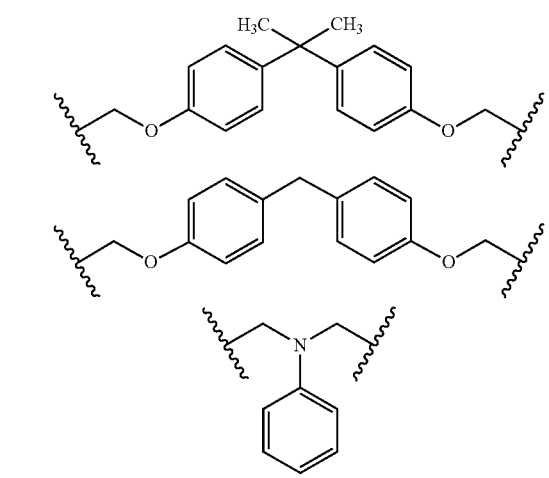

-continued

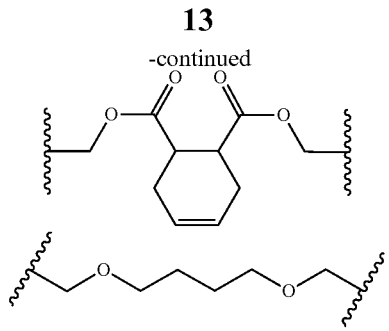

In an aliphatic polyamine according to the structure above, c is an integer. Preferably, c is an integer of from 1 to 10, more preferably c is an integer of from 2 to 8, even more preferably c is an integer of from 4 to 6.

In one embodiment, the dental root canal filling composition further comprises at least one radio-opaque particulate filler, preferably at least $CaWO_4$ as the at least one particulate filler.

The radiopaque particulate filler usually has an average particle size of from 0.005 to 100 μm, preferably of from 0.01 to 40 μm as measured using, for example, by electron microscopy or by using a conventional laser diffraction particle sizing method as embodied by a MALVERN Mastersizer S or MALVERN Mastersizer 2000 apparatus. The radiopaque particulate filler may be a multi-modal radiopaque particulate filler representing a mixture of two or more radiopaque particulate fractions having different average particle sizes. The radiopaque particulate filler may also be a mixture of particles of different chemical composition.

The radiopaque filler in the form of a particulate filler or a nanofiller may be selected from any of the zinc, ytterbium, yttrium, gadolinium, zirconium, strontium, tungsten, tantalum, thorium, niobium, barium, bismuth, molybdenum and lanthanum metals, alloys thereof, organometallic complexes thereof, oxides, sulfates, carbonates, halides, oxy-halides, subnitrates, tungstates and carbides thereof, iodine and inorganic iodides, either singly or in combination. In a preferred embodiment, the radiopaque filler is selected from any of bismuth trioxide, bismuth carbonate, bismuth oxy-chloride, bismuth subnitrate, zirconium oxide, barium sulfate, barium tungstate and calcium tungstate, either singly or in combination. In an even more preferred embodiment, the radiopaque filler is selected from barium tungstate and calcium tungstate, either singly or in combination. Preferably the radiopaque filler is calcium tungstate.

The dental composition according to the present invention preferably comprises 1 to 85 percent by weight, more preferably 40 to 85 percent by weight, even more preferably 40 to 70 percent by weight, of the radiopaque particulate filler, based on the weight of the entire composition.

The viscosity and thixotropicity of the uncured as well as the physical properties of the cured compositions may be controlled by varying the sizes and surface areas of the filler.

The filler may be surface treated with one or more silanating agents. Preferred silanating agents include those having at least one polymerizable double bond and at least one group that easily hydrolyses with water. Examples of such agents include 3-methacryloxypropyltrimethoxysilane, 3-methacryloxypropyl-dimethoxy-monochlorosilane, 3-methacryloxypropyldichloromonomethoxysilane, methacryloxypropyltri-chlorosilane, 3-methacryloxypropyldichloromonomethylsilane, 3-methacryloxypropylmonochlorodimethylsilane, or 2,3-epoxypropyltrimethoxysilane, aminopropyltrimethoxysilane, mercaptopropyltrimethoxysilane and mixtures thereof.

The present invention also claims the use of such an inventive dental root canal filling composition for a treatment or a prevention of an endodontic disease.

Further, the object of the present invention is also solved by a storage-stable two-pack dental root canal filling composition comprising a first paste and a second paste, wherein the dental root canal filling composition is a composition as defined by one of the preceding claims 1 to 13.

It was found that a small difference in the viscosities between the first and the second paste leads to a sufficient miscibility of the first paste and the second paste, and therefore handling problems during the use of the two-pack dental root canal filling composition can be avoided. Furthermore, it was found that such two-pack dental root canal filling compositions exhibit excellent storage stabilities.

In a preferred embodiment thereof, the storage-stable two-pack dental root canal filling composition is provided in a double chamber cartridge, wherein said double chamber cartridge is made of a polymeric material, preferably made of polypropylene or polybutyleneterephthalate, especially preferred made of polybutyleneterephthalate.

It is especially preferred to produce the double chamber cartridge out of polybutyleneterephthalate, which provides in general superior barrier properties (compared to polypropylene) of the two chambers against possible oxygen migration; and especially against the migration of coloring components of the amine paste composition into the chamber material.

In one embodiment, the at least one di- or polyepoxides have a dynamic viscosity at 23° C. of less than 30 Pa·s.

In one embodiment, the dental root canal filling composition has a gelation time of less than 25 hours, preferably less than 20 hours, and more preferably less than 16 hours.

In one embodiment, the dental root canal filling composition has a glass transition temperature $T_g$ ranging from 38 to 80° C., preferably from 39 to 60° C., and more preferably from 40 to 50° C.

The present invention thus addresses the problem of providing a suitable alternative of primary monoamines as part of a dental root canal filling composition, which allows mimicking of the characteristic AH Plus paste properties in terms of setting kinetics, thermomechanical behavior and handling properties (flow, film thickness).

The following non-limiting examples are provided to illustrate an embodiment of the present invention and to facilitate understanding of the invention, but are not intended to limit the scope of the invention, which is defined by the claims appended hereto.

EXAMPLES

Materials

4-Tert-butyl cyclohexylamine was obtained from abcr. 2-(3-Methylbutyl)cyclopentane-1-amine, cyclopentylamine, cycloheptylamine and cyclooctylamine were purchased from Sigma Aldrich. 1-Aminoindan and 4-methyl cyclohexylamin were obtained from TCI Germany. 1-Aminotetraline (1,2,3,4-Tetrahydro-1-naphthylamine) was purchased from CarboSynth Limited. All other chemicals were purchased from common chemical suppliers. SICOVIT® (Yellow 10 E 172) was purchased from Simon and Werner GmbH. TCD represents a TCD diamine of the following formula:

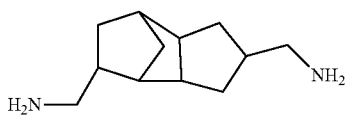

Methods

Gelation Time Measurement

Amine pastes and epoxide pastes were mixed ($m_{Amine}/m_{Epoxide}$, mixing ratios are given for each application example) on a mixing plate using a spatula. Mixing was applied for 30 s until a homogenous paste-paste-mixture was accomplished. The respective mass of the individual pastes was determined by means of a balance with an accuracy of ±0.0001 g. Approx. 1 mL of the paste-paste mixture was transferred into a glass vial (10 mL) with a round-cut plastic lid and glass bar. The glass bar needs to be in contact with the paste mixture. The vial was placed in an climate chamber at 37° C. (t0) with a temperature control [$\Delta T = \pm 1°$ C., humidity=30-50%]. Gelation was achieved when rotation of the glass bar was no longer possible (tgelation).

DSC Measurements

DSC (Differential Scanning calorimetry) samples were prepared as described in the section above (gelation time measurement) and cured for 2 weeks 37° C. in a climate chamber [$\Delta T = \pm 1°$ C., humidity=30-50%]. On a Sartorius Analytical Balance, the cured samples were portioned to individual masses of 4.5-5.5 mg and transferred into aluminum crucibles (diameter: 6 mm) for DSC characterization. Measurements were performed on a DSC 204 F1 Phoenix (Netzsch-Gerätebau GmbH) using a heat flow of 30 K/m in for heating and cooling cycles. Analysis was performed using the software Netsch Measurement, Netsch ASC Manager (auto sampling), Netsch Proteus (analysis).

Paste Formulations

AH Plus Reference

AH Plus amine (Batch 1807000639) and AH Plus epoxide paste (Batch 1807000260) were mixed in a ratio mEpoxide/mAmine=0.8645. The mixed pastes exhibit a gelation time of less than 15 h (method described above), flow of 22 mm (according to ISO 6876:2012), film thickness of 17±2 µm (according to ISO 6876:2012).

AH Plus Epoxide (Batch 1807000260) and AH Plus Amine (Batch 1807000785) were mixed (mEpoxide/mAmine=0.8645, ASO3-153-01) exhibiting glass transition temperatures of 45.5±1.4° C. (DSC, MAW1-05-01) after curing for 2 weeks at 37° C.

Application Example 1

Paste A.1

Preparation of Amine Paste A1 (SAR5-45-01)

2-(3-Methylbutyl)cyclopentane-1-amine

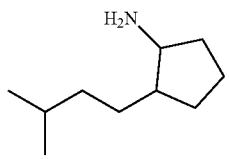

2-(3-Methylbutyl)cyclopentane-1-amine (0.4939 g, 3.1807 mmol), N,N'-dibenzyl-5-oxanonandiamin-1,9 (OPC-91; 1.1125 g, 3.2671 mmol), TCD-Amine (0.0649 g, 0.3340 mmol), CaWO$_4$ (6.4223 g), ZrO$_2$ (1.6080 g), Aerosil® 200 (0.1955 g) and Baysilone M-500 (0.1051 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A1 (SAR5-44-01)

Bisphenol A diglycidyl ether (2.5738 g, 13.834 mmol eq. epoxide) and Bisphenol F diglycidyl ether (0.3286 g, 1.955 mmol eq. epoxide), CaWO$_4$ (5.6472 g), ZrO$_2$ (1.4128 g), Aerosil® 200 (0.0286 g) and SICOVIT® (Yellow 10 E172) (0.0151 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A1 and Amine Paste A1 were mixed in a ratio of 1.0000:1.1103 m(epoxide paste)/m(amine paste). The gel time at 37° C. was 15 h 20 min (SARS-50-01), flow (according to ISO6876:2012): 21.2 mm (SAR5-51-01), film thickness (according to ISO6876:2012): 10 µm (SAR5-52-01). Glass transition temperature (cured for 2 weeks at 37° C.): 45.8° C. (MAW1-15-01).

Application Example 2

Paste A.2

Preparation of Amine Paste A2 (SAR5-14-01)

1-Aminoindan

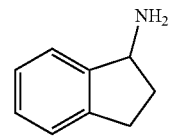

1-Aminoindan (0.7424 g, 5.5740 mmol), OPC-91 (1.6697 g, 4.9034 mmol), TCD-Amine (0.0997 g, 0.5131 mmol), CaWO$_4$ (9.6343 g), ZrO$_2$ (2.4116 g), Aerosil® 200 (0.2925 g) and Baysilone M-500 (0.1573 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A2 (SAR5-13-01)

Bisphenol A diglycidyl ether (3.8613 g, 20.7545 mmol eq. epoxide) and Bisphenol F diglycidyl ether (0.4953 g, 2.9470 mmol eq. epoxide), CaWO$_4$ (8.4719 g), ZrO$_2$ (2.1168 g), Aerosil® 200 (0.0431 g) and SICOVIT® (Yellow 10 E172) (0.0217 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A2 and Amine Paste A2 were mixed in a ratio of 1.0000:1.0335 m(epoxide paste)/m(amine paste). The gel time at 37° C. was 14 h 5 min (SARS-29-02), flow (according to ISO6876:2012): 23.0 mm (SAR5-25-01), film thickness (according to ISO6876:2012): 17 µm (SAR5-27-

Application Example 3

Paste A.3

Preparation of Amine Paste A3 (SAR5-24-01)

Cyclopentylamine

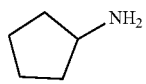

Cyclopentylamine (0.7400 g, 8.6905 mmol), OPC-91 (1.6679 g, 4.8981 mmol), TCD-Amine (0.0996 g, 0.5126 mmol), $CaWO_4$ (9.6335 g), $ZrO_2$ (2.4128 g), Aerosil®200 (0.2921 g) and Baysilone M-500 (0.1618 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A3 (SAR5-23-01)

Bisphenol A diglycidyl ether (3.8610 g, 20.7588 mmol eq. epoxide) and Bisphenol F diglycidyl ether (0.4874 g, 2.9000 mmol eq. epoxide), $CaWO_4$ (8.4700 g), $ZrO_2$ (2.1176 g), Aerosil® 200 (0.0423 g) and SICOVIT® (Yellow 10 E172) (0.0211 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A3 and Amine Paste A3 were mixed in a ratio of 1.0000:0.8110 m(epoxide paste)/m(amine paste). The gel time at 37° C. was 14 h 5 min (SAR5-30-04), flow (according to ISO6876:2012): 21.8 mm (SAR5-27-01), film thickness (according to ISO6876:2012): 9 µm (SAR5-29-02). Glass transition temperature (cured for 2 weeks at 37° C.): 41.8° C. (MAW1-16-01).

Application Example 4

Paste A.4

Preparation of Amine Paste A4 (SAR5-47-01)

4-Tert-butyl Cyclohexylamine

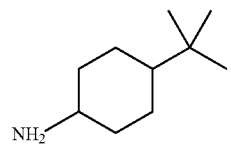

4-Tert-butyl cyclohexylamine (0.7418 g, 4.7766 mmol), OPC-91 (1.6694 g, 4.9025 mmol), TCD-Amine (0.0967 g, 0.4977 mmol), $CaWO_4$ (9.6333 g), $ZrO_2$ (2.4126 g), Aerosil® 200 (0.2925 g) and Baysilone M-500 (0.1568 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A4 (SAR5-46-01)

Bisphenol A diglycidyl ether (3.8611 g, 20.7534 mmol eq. epoxide) and Bisphenol F diglycidyl ether (0.4905 g, 2.9185 mmol eq. epoxide), $CaWO_4$ (8.4705 g), $ZrO_2$ (2.1155 g), Aerosil® 200 (0.0422 g) and SICOVIT® (Yellow 10 E172) (0.0207 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A4 and Amine Paste A4 were mixed in a ratio of 1.0000:1.1104 m(epoxide paste)/m(amine paste). The gel time at 37° C. was 15 h 20 min (SAR5-50-02), flow (according to ISO6876:2012): 20.0 mm (SAR5-51-02), film thickness (according to ISO6876:2012): 9 µm (SAR5-52-02). Glass transition temperature (cured for 2 weeks at 37° C.): 44.9° C. (MAW1-17-01).

Application Example 5

Paste A.5

Preparation of Amine Paste A5 (SAR5-18-01)

4-Methyl Cyclohexylamine

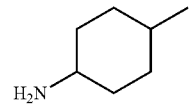

4-Methyl cyclohexylamine (0.7409 g, 6.5451 mmol), OPC-91 (1.6699 g, 4.9040 mmol), TCD-Amine (0.0960 g, 0.4941 mmol), $CaWO_4$ (9.6338 g), $ZrO_2$ (2.4121 g), Aerosil® 200 (0.2928 g) and Baysilone M-500 (0.1578 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A5 (SAR5-17-01)

Bisphenol A diglycidyl ether (3.8624 g, 20.7604 mmol eq. epoxide) and Bisphenol F diglycidyl ether (0.4893 g, 2.9113 mmol eq. epoxide), $CaWO_4$ (8.4702 g), $ZrO_2$ (2.1175 g), Aerosil® 200 (0.0422 g) and SICOVIT® (Yellow 10 E172) (0.0215 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A5 and Amine Paste A5 were mixed in a ratio of 1.0000:0.9518 m(epoxide paste)/m(amine paste). The gel time at 37° C. was 14 h 5 min (SARS-30-01), flow (according to ISO6876:2012): 21.2 mm (SAR5-26-01), film thickness (according to ISO6876:2012): 14 µm (SAR5-28-01). Glass transition temperature (cured for 2 weeks at 37° C.): 42.6° C. (MAW1-18-01).

Application Example 6

Paste A.6

Preparation of Amine Paste A6 (SAR5-20-01)

Cycloheptylamine

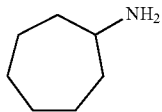

Cycloheptylamine (0.7415 g, 6.5504 mmol), OPC-91 (1.6683 g, 4.8993 mmol), TCD-Amine (0.0949 g, 0.4884 mmol), CaWO$_4$ (9.6321 g), ZrO$_2$ (2.4120 g), Aerosil®200 (0.2935 g) and Baysilone M-500 (0.1585 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A6 (SAR5-19-01)

Bisphenol A diglycidyl ether (3.8620 g, 20.7583 mmol eq. epoxide) and Bisphenol F diglycidyl ether (0.4889 g, 2.9090 mmol eq. epoxide), CaWO$_4$ (8.4718 g), ZrO$_2$ (2.1182 g), Aerosil® 200 (0.0427 g) and SICOVIT® (Yellow 10 E172) (0.0221 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A6 and Amine Paste A6 were mixed in a ratio of 1.0000:0.9518 m(epoxide paste)/m(amine paste). The gel time at 37° C. was 14 h 5 min (SARS-30-02), flow (according to ISO6876:2012): 21.8 mm (SAR5-26-02), film thickness (according to ISO6876:2012): 13 μm (SAR5-28-02). Glass transition temperature (cured for 2 weeks at 37° C.): 42.6° C. (MAW1-18-01).

Application Example 7

Paste A.7

Preparation of Amine Paste A7 (SAR5-22-01)

Cyclooctylamine

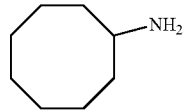

Cyclooctylamine (0.7415 g, 5.8280 mmol), OPC-91 (1.6677 g, 4.8975 mmol), TCD-Amine (0.0981 g, 0.5049 mmol), CaWO$_4$ (9.6344 g), ZrO$_2$ (2.4145 g), Aerosil®200 (0.2926 g) and Baysilone M-500 (0.1583 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A7 (SAR5-21-01)

Bisphenol A diglycidyl ether (3.8611 g, 20.7534 mmol eq. epoxide) and Bisphenol F diglycidyl ether (0.4916 g, 2.9250 mmol eq. epoxide), CaWO$_4$ (8.4713 g), ZrO$_2$ (2.1185 g), Aerosil® 200 (0.0421 g) and SICOVIT® (Yellow 10 E172) (0.0225 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A7 and Amine Paste A7 were mixed in a ratio of 1.0000:1.0105 m(epoxide paste)/m(amine paste). The gel time at 37° C. was 14 h 5 min (SARS-30-03), flow (according to ISO6876:2012): 20.5 mm (SAR5-26-03), film thickness (according to ISO6876:2012): 8 μm (SAR5-28-03). Glass transition temperature (cured for 2 weeks at 37° C.): 44.2° C. (MAW1-19-01).

Application Example 8

Paste A.8

Preparation of Amine Paste A8 (SAR5-49-01)

1-Aminotetraline

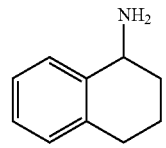

1-Aminotetraline (0.7412 g, 5.0346 mmol), OPC-91 (1.6706 g, 4.9060 mmol), TCD-Amine (0.0967 g, 0.4977 mmol), CaWO$_4$ (9.6336 g), ZrO$_2$ (2.4132 g), Aerosil®200 (0.2924 g) and Baysilone M-500 (0.1574 g) were transferred into a speed mixer container and mixed for 5 min with 2150 rpm. The paste was manually mixed with a spatula followed by another speed mixer run (1 min, 2150 rpm) to afford a homogenous, white paste.

Preparation of Epoxide Paste A8 (SAR5-48-01)

Bisphenol A diglycidyl ether (3.8616 g, 20.7561 mmol eq. epoxide) and Bisphenol F diglycidyl ether (0.4871 g, 2.8982 mmol eq. epoxide), CaWO$_4$ (8.4709 g), ZrO$_2$ (2.1180 g), Aerosil® 200 (0.0426 g) and SICOVIT® (Yellow 10 E172) (0.0220 g) were transferred into a speed mixer container and mixed for 5 min with 2150 rpm. The paste was manually mixed with a spatula followed by another speed mixer run (1 min, 2150 rpm) to afford a homogenous, light yellow paste.

Epoxide Paste A8 and Amine Paste A8 were mixed in a ratio of 1.0000:1.0838 m(epoxide paste)/m(amine paste). The gel time at 37° C. was 15 h 20 min (SARS-50-03), flow (according to ISO6876:2012): 20.3 mm (SAR5-51-03), film thickness (according to ISO6876:2012): 8 μm (SAR5-52-03). Glass transition temperature (cured for 2 weeks at 37° C.): 48.9° C. (MAW1-19-01).

Application Example 9

Paste B.1

Preparation of Epoxide Paste B1

Bisphenol A diglycidyl ether (8.1214 g) and bisphenol F diglycidyl ether (1.0264 g) transferred into a speed mixer container and mixed for 5 min with 2150 rpm. CaWO4 Grade B (10.3636 g) and CaWO4 (10.3636 g), Aerosil® 200 (0.086 g) and SICOVIT® (Yellow 10 E172) (0.0456 g) were added and speed mixing was applied (5 min, 2150 rpm). The paste was manually mixed with a spatula followed by another speed mixer run (3 min, 2150 rpm) to afford a homogenous, light yellow paste.

Preparation of Amine Paste B1

1-Amino tetralin (1,2,3,4-tetrahydro-1-naphthylamine) (1.3475 g), N,N'-dibenzyl-5-oxanonandiamin-1,9 (OPC-91) (3.0498 g) and IPDA (isophorone diamine) (0.1606 g) were transferred into a speed mixer container and mixed for 5 min with 2150 rpm. $CaWO_4$ (24.5433 g), Aerosil® 200 (0.5839 g) and Baysilone M500 (0.3186 g) were added and speed mixing was applied (5 min, 2150 rpm). The paste was manually mixed with a spatula followed by another speed mixer run (3 min, 2150 rpm) to afford a homogenous, white paste.

Mixtures of Paste B1

Amine Paste A1 and epoxide Paste A1 were mixed in a ratio mEpoxide/mAmine=0.8070. The mixed pastes exhibit a gelation time of less than 15 h, flow of 21 mm, film thickness of 13 mm (all according to ISO 6876) and glass transition temperature of 45±2° C. (DSC) after curing for 2 weeks at 37° C.

Application Example 10

Paste B.2

Preparation of Epoxide Premixtures

Epoxide resins and cellulose ester/ether is dispersed in T range from 40-100° C. Clear resins can be achieved within 10 min-10 h. Ultra-turrax agitation can used to promote dispensing.

Epoxide Premixture 1

As an example: Bisphenol A diglycidyl ether (25.740 g) and bisphenol F diglycidyl ether (3.250 g) and cellulose acetate butyrate (0.075 g, CAS 9004-36-8, Mn=70 kg/mol) are mixed using the above-described procedure to form the respective epoxide premixture (viscosity: 23 Pa*s [23° C.]).

Preparation of Epoxide Paste B2

Epoxide Premixture 1 (4.349 g) and $CaWO_4$ (10.589 g), Aerosil® 200 (0.042 g) and SICOVIT® (Yellow 10 E172) (0.021 g) were added and speed mixing was applied (5 min, 2150 rpm). The paste was manually mixed with a spatula followed by another speed mixer run (3 min, 2150 rpm) to afford a homogenous, light yellow paste.

Preparation of Amine Premixtures

Amine resin and cellulose ether is dispersed in T range from 40-120° C. Clear resins can be achieved within 10 min-12 h. Ultra-turrax agitation can used to promote dispensing.

Amine Premixture 1

As an example: 4-Tert-Butylcyclohexylamine (CAS 5400-88-4) (4.941 g), N,N'-dibenzyl-5-oxanonandiamin-1,9 (OPC-91) (11.119 g) and TCD (0.635 g) and ethyl cellulose (0.075 g, CAS 9004-57-3, 10 cP [5% in toluene/ethanol 80:20]) are mixed using the above-described procedure to form the respective epoxide premixture (viscosity: 0.07 Pa*s [23° C.]).

Preparation of Amine Paste B2

Amine Premixture 1 (2.504 g) and CaWO4 (12.046 g), Aerosil® 200 (0.270 g) and Baysilone M500 (0.180 g) were added and speed mixing was applied (5 min, 2150 rpm). The paste was manually mixed with a spatula followed by another speed mixer run (3 min, 2150 rpm) to afford a homogenous, white paste.

Mixtures of Paste B2

Amine Paste B2 and epoxide Paste B2 were mixed in a ratio mEpoxide/mAmine=1.000:1.110. The mixed pastes exhibit a gelation time of less than 15 h, flow of 22 mm, film thickness of 16 mm (all according to ISO 6876) and glass transition temperature of 44±2° C. (DSC, after curing for 2 weeks at 37° C.

Application Example 11

Paste B.3

Preparation of Epoxide Paste B3

Epoxide Premixture 1 (4.349 g) and CaWO4 (10.589 g), Aerosil R202 (0.042 g) and SICOVIT® (Yellow 10 E172) (0.021 g) were added and speed mixing was applied (5 min, 2150 rpm). The paste was manually mixed with a spatula followed by another speed mixer run (3 min, 2150 rpm) to afford a homogenous, light yellow paste.

Preparation of Amine Paste B3

Amine Premixture 1 (2.504 g) and CaWO4 (12.046 g), Aerosil® 200 (0.270 g) and Baysilone M500 (0.180 g) were added and speed mixing was applied (5 min, 2150 rpm). The paste was manually mixed with a spatula followed by another speed mixer run (3 min, 2150 rpm) to afford a homogenous, white paste.

Mixtures of Paste B3

Amine Paste B3 and epoxide Paste B3 were mixed in a ratio mEpoxide/mAmine=1.000:1.110. The mixed pastes exhibit a gelation time of less than 15 h, flow of 22 mm, film thickness of 16 mm (all according to ISO 6876) and glass transition temperature of 45±2° C. (DSC, after curing for 2 weeks at 37° C.

Application Example 12

Paste B.4

Preparation of Epoxide Paste B4

Epoxide Premixture 1 (4.349 g) and CaWO4 (10.589 g), Aerosil 200 (0.042 g) and SICOVIT® (Yellow 10 E172) (0.021 g) were added and speed mixing was applied (5 min, 2150 rpm). The paste was manually mixed with a spatula followed by another speed mixer run (3 min, 2150 rpm) to afford a homogenous, light yellow paste.

Amine Premixture 2

1-Amino Tetraline (CAS 2217-40-5) (4.941 g), N,N'-dibenzyl-5-oxanonandiamin-1,9 (OPC-91) (11.119 g) and IPDA (0.635 g) and ethyl cellulose (0.075 g, CAS 9004-57-3, 10 cP [5% in toluene/ethanol 80:20]) are mixed using the above-described procedure to form the respective epoxide premixture (viscosity: 0.08 Pa*s [23° C.]).

Preparation of Amine Paste B4

Amine Premixture 2 (2.504 g) and $CaWO_4$ (12.046 g), Aerosil® 200 (0.270 g) and Baysilone M500 (0.180 g) were added and speed mixing was applied (5 min, 2150 rpm). The paste was manually mixed with a spatula followed by another speed mixer run (3 min, 2150 rpm) to afford a homogenous, white paste.

Mixtures of Paste B4

Amine Paste B4 and epoxide Paste B4 were mixed in a ratio mEpoxide/mAmine=1.000:1.070. The mixed pastes exhibit a gelation time of less than 15 h, flow of 22 mm, film thickness of 16 mm (all according to ISO 6876) and glass transition temperature of 47±2° C. (DSC, after curing for 2 weeks at 37° C.

Application Example 13

Paste B.5

Preparation of Epoxide Paste B5

Bisphenol A diglycidyl ether (3.861 g) and bisphenol F diglycidyl ether (0.488 g) transferred into a speed mixer container and mixed for 5 min with 2150 rpm. CaWO4 (10.3636 g) and Aerosil R202 (0.042 g) and SICOVIT® (Yellow 10 E172) (0.021 g) were added and speed mixing was applied (5 min, 2150 rpm). The paste was manually mixed with a spatula followed by another speed mixer run (3 min, 2150 rpm) to afford a homogenous, light yellow paste.

Preparation of Amine Paste B5

1-Amino tetralin (1,2,3,4-tetrahydro-1-naphthylamine) (0.741 g), N,N'-dibenzyl-5-oxanonandiamin-1,9 (OPC-91) (1.668 g) and IPDA (isophorone diamine) (0.095 g) were transferred into a speed mixer container and mixed for 5 min with 2150 rpm. CaWO4 (12.046 g), Aerosil® 200 (0.270 g) and Baysilone M500 (0.180 g) were added and speed mixing was applied (5 min, 2150 rpm). The paste was manually mixed with a spatula followed by another speed mixer run (3 min, 2150 rpm) to afford a homogenous, white paste.

Mixtures of Paste B5

Amine Paste B5 and epoxide Paste B5 were mixed in a ratio mEpoxide/mAmine=1.000:1.070. The mixed pastes exhibit a gelation time of less than 15 h, flow of 23 mm, film thickness of 13 mm (all according to ISO 6876) and glass transition temperature of 46±2° C. (DSC) after curing for 2 weeks at 37° C.

It will be understood that the embodiments described herein are merely exemplary and that a person skilled in the art may make many variations and modifications without departing from the spirit and scope of the invention. All such variations and modifications, including those discussed above, are intended to be included within the scope of the invention as defined by the appended claims.

The invention claimed is:

1. Dental root canal filling composition comprising
    (i) at least one di- or polyepoxide;
    (ii) at least one primary monoamine; and
    (iii) at least one diamine;
    wherein the at least one primary monoamine comprises at least one cyclic non-aromatic hydrocarbon group and at least one primary amino group; wherein said at least one primary amino group is directly attached to said at least one cyclic non-aromatic hydrocarbon group; or
    wherein said at least one primary amino group comprises a hydrocarbon moiety, which is directly attached to said at least one cyclic non-aromatic hydrocarbon group,
    wherein the hydrocarbon moiety, which comprises the at least one primary amino group, is a linear or branched alkyl, alkoxy, or alkenyl group; wherein at least one carbon atom of the linear or branched alkyl, alkoxy, or alkenyl group is substituted by an oxygen, sulfur and/or a nitrogen atom.

2. Dental root canal filling composition according to claim 1 wherein the at least one cyclic non-aromatic hydrocarbon group is formed by three to nine ring-forming atoms.

3. Dental root canal filling composition according to claim 2 wherein at least one of the three to nine ring-forming atoms of the cyclic non-aromatic hydrocarbon group is substituted by a linear or branched hydrocarbon group having 1 to 8 carbon atoms, which may be substituted by a hydroxyl group, a $C_{1-6}$ alkoxy group, a $C_{6-10}$ aryl group, a $C_{6-10}$ aryloxy group, a $C_{7-14}$ arylalkyl group, or a $C_{7-14}$ arylalkoxy group.

4. Dental root canal filling composition according to claim 2 wherein the hydrocarbon moiety, which comprises the at least one primary amino group, is attached to at least one ring-forming atom of the at least one cyclic non-aromatic hydrocarbon group; wherein said at least one ring-forming atom is a carbon atom or a nitrogen atom.

5. Dental root canal filling composition according to claim 2 wherein at least one ring-forming atom of the at least one cyclic non-aromatic hydrocarbon group is a sulfur atom, an oxygen atom, or a nitrogen atom; with the proviso that the hydrocarbon moiety, which comprises the at least one primary amino group, is not attached to said at least one ring-forming atom.

6. Dental root canal filling composition according to claim 1 wherein in that the at least one primary monoamine further comprises at least one aromatic hydrocarbon group, wherein at least one of said aromatic hydrocarbon groups is directly attached to the at least one cyclic non-aromatic hydrocarbon group.

7. Dental root canal filling composition according to claim 2 wherein the at least one diamine of the dental root canal filling composition is a disecondary diamine and/or a primary diamine.

8. Dental root canal filling composition according to claim 1 wherein the dental root canal filling composition further comprises at least one rheological additive and/or rheological modifier.

9. Dental root canal filling composition according to claim 1 wherein the dental root canal filling composition is substantially free of a compound of the following formula (I)

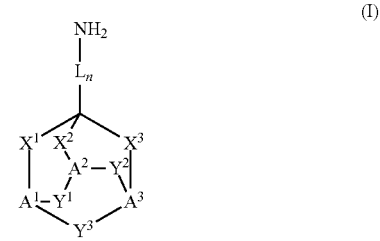

wherein
L is a direct bond; or a straight-chain or branched hydrocarbon group having 1 to 8 carbon atoms, which may be substituted by one or more fluorine atoms, a hydroxyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group;
at least one of $A^1$ $A^2$, and $A^3$ represents CH, and the remaining groups are a group C—$R^1$;
at least three of $X^1$, $X^2$, $X^3$ $Y^1$, $Y^2$, and $Y^3$, represent $CH_2$, and the remaining groups are a $CHR^2$-group, a $CR^3R^4$-group, or a C=$NR^5$-group; and
n is 0 or 1; wherein
$R^1$ is a fluorine atom, a hydroxyl group, an amino group, a $C_{1-6}$ alkyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group; and $R^2$ is a fluorine atom, a hydroxyl group, an amino group, a $C_{1-6}$ alkyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group;

$R^3$ and $R^4$ which may be the same or different, independent from each other represent a fluorine atom, a $C_{1-6}$ alkyl group, a $C_{1-6}$ alkoxy group, a $C_{1-6}$ alkylthio group, a $C_{6-10}$ aryl group, a $C_{6-10}$ aryloxy group, a $C_{7-14}$ arylalkyl group, or a $C_{7-14}$ arylalkoxy group, or $R^3$ and $R^4$ may be linked together and forming together with the carbon atom to which they are bonded a 3 to 6-membered saturated hydrocarbon ring;

$R^5$ is a hydroxyl group, an amino group, a $C_{1-6}$ alkyl group, a $C_{1-6}$ alkoxy group, a $C_{6-10}$ aryl group, a $C_{6-10}$ aryloxy group, a $C_{7-14}$ arylalkyl group, or a $C_{7-14}$ arylalkoxy group;

provided that when n is 0, then at least one of $R^1$, $R^2$, $R^3/R^4$ and $R^5$, is present.

10. Dental root canal filling composition according to claim 1 wherein the at least one di- or polyepoxide is a compound of the following formula (II):

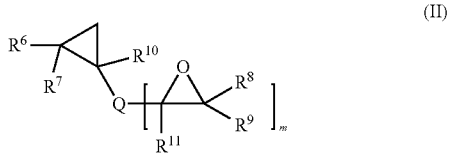

wherein
Q is a (m+1)-valent organic group,
$R^6$, $R^7$ and $R^{10}$
which may be the same or different and which are independent from each other, represent a hydrogen atom, or a $C_{1-6}$ alkyl group,
$R^8$, $R^9$ and $R^{11}$
which may be the same or different and which are independent from each other, represent a hydrogen atom, or a $C_{1-6}$ alkyl group,
m is an integer of from 1 to 3.

11. Dental root canal filling composition according to claim 1 wherein the dental root canal filling composition further comprises an aliphatic polyamine selected among compounds of the following structures:

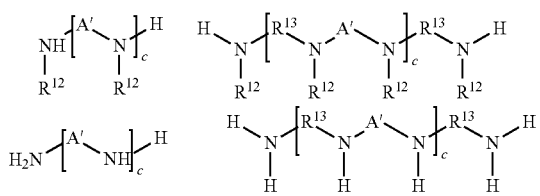

wherein
$R^{12}$ is hydrogen or a substituted or unsubstituted $C_{1-18}$ alkyl group, a substituted or unsubstituted $C_{3-18}$ cycloalkyl group, or a substituted or unsubstituted $C_{7-18}$ aryalkyl group,
$R^{13}$ is a difunctional substituted or unsubstituted $C_1$ to $C_{18}$ alkylene group, or a substituted or unsubstituted cycloalkylene group,
A' is a moiety derived from a compound that is capable of an addition reaction with amines such as di- or polyepoxides, and
c is an integer.

12. Dental root canal filling composition according to claim 1 wherein the dental root canal filling composition further comprises at least one radio-opaque particulate filler.

13. Dental root canal filling composition according to claim 1 wherein the dental root canal filling composition is capable of treating or preventing an endodontic disease.

14. Dental root canal filling composition according to claim 1 wherein the dental root canal filling composition comprises a first paste and a second paste and is stable.

15. Dental root canal filling composition comprising
(i) at least one di- or polyepoxide;
(ii) 1-aminotetraline; and
(iii) at least one diamine.

16. The dental root canal filling composition according to claim 15, wherein the at least one diamine of the dental root canal filling composition is a disecondary diamine or a primary diamine, wherein preferably the dental root canal filling composition comprises at least one primary diamine and at least one disecondary diamine.

17. The dental root canal filling composition according to claim 15, wherein the dental root canal filling composition further comprises at least one rheological additive and/or rheological modifier, such as ethyl cellulose and cellulose acetate butyrate.

18. The dental root canal filling composition according to claim 15, wherein the dental root canal filling composition further comprises at least one radio-opaque particulate filler.

19. The dental root canal filling composition according to claim 18, wherein the at least one radio-opaque particulate filler is $CaWO_4$.

20. A storage-stable two-pack dental root canal filling composition comprising a first paste and a second paste, wherein the dental root canal filling composition is the dental root canal filling composition according to claim 15.

* * * * *